April 23, 1946. T. H. SWISHER 2,398,813
GUN-TRAINING APPARATUS
Filed Sept. 23, 1943 12 Sheets-Sheet 8

Inventor:
Thomas H. Swisher,
by Harry E Dunham
His Attorney.

April 23, 1946.  T. H. SWISHER  2,398,813
GUN-TRAINING APPARATUS
Filed Sept. 23, 1943   12 Sheets-Sheet 9

Inventor:
Thomas H. Swisher,
by Harry E. Dunham
His Attorney.

April 23, 1946.  T. H. SWISHER  2,398,813
GUN-TRAINING APPARATUS
Filed Sept. 23, 1943  12 Sheets-Sheet 10

Inventor:
Thomas H. Swisher,
by Harry E. Dunham
His Attorney.

April 23, 1946.  T. H. SWISHER  2,398,813
GUN-TRAINING APPARATUS
Filed Sept. 23, 1943  12 Sheets-Sheet 11

Inventor:
Thomas H. Swisher,
by Harry E. Dunham
His Attorney.

Patented Apr. 23, 1946

2,398,813

UNITED STATES PATENT OFFICE 2,398,813

GUN-TRAINING APPARATUS

Thomas H. Swisher, Elmhurst, Ill., assignor to Edison General Electric Appliance Company, Inc., Chicago, Ill., a corporation of New York Application September 23, 1943, Serial No. 503,544

7 Claims. (Cl. 35—25)

This invention relates to gun-training apparatus, more particularly to apparatus for training personnel to fire actual automatic machine guns under conditions simulating actual fire and battle conditions, and it has for its object the provision of improved apparatus of this character.

More specifically, this invention relates to gun-training apparatus which will teach gunners the correct sighting-lead to hit moving objects such as airplanes, tanks, and other targets, to teach basic projectile characteristics such as tracer shooting, cut-back, trajectory, etc., and to enable the trainee to thoroughly understand the mechanics of a stream of bullets hitting an airplane or other moving target; and to simulate as near as possible actual battle conditions which cause nervous strain and fatigue such as noise distractions, muzzle blasts, recoil and other factors, all indoors at scale range without the expenditure of live ammunition.

In accordance with this invention a fluid-operated training gun is provided which will project pellets either visibly or invisibly, one after the other in a stream.

The gun comprises an improved organization of parts which introduces a spherical pellet into the gun barrel, holds it from rolling therein, then releases it, and just after the instant of release quickly admits air under pressure for projecting it from the barrel. These acts are coordinated so that the round pellets do not roll in the barrel, are projected in a straight line without rotation through the barrel, and are forced from it without imparting to it any rotary motion or side deflection, whereby the pellet is caused to fly in a true scale trajectory of a real bullet.

In addition, the organization includes means for imparting to the handle of the gun a vibratory motion synchronized with the firing of the pellets so that recoil of an actual gun is simulated.

The timing of the firing and recoil is controlled by suitable timing mechanism, but all is under the master control of a trigger which is shaped and positioned just as is the real trigger of an automatic gun shaped and positioned.

Furthermore, the organization includes a loud speaker which generates gun muzzle blast noise, this mechanism also being controlled by the timer to give the gun noises at the proper times—and the mechanism also being under the master control of the trigger.

Also the system of control includes means for selectively rendering the various operating mechanisms operable or inoperable at will. This is so that a beginner trainee can begin his training gradually. Gun shyness or fear caused by firing a real gun for the first time can be eliminated or greatly reduced. Beginners can be started with pellet firing only, then with recoil, gun sound, and battle sound added, one at a time.

In addition, the system is adapted to night firing by using pellets and target formed of or coated with suitable materials to cause them to fluoresce in an ultraviolet light field so that the pellets and target only are visible while all else is dark, thereby giving a realistic simulation of night firing. An ultraviolet lamp is movable with the gun so as to project its light onto the point of impact of the pellets against the target.

For a more complete understanding of this invention, reference should be had to the accompanying drawings in which.

Figure 1:
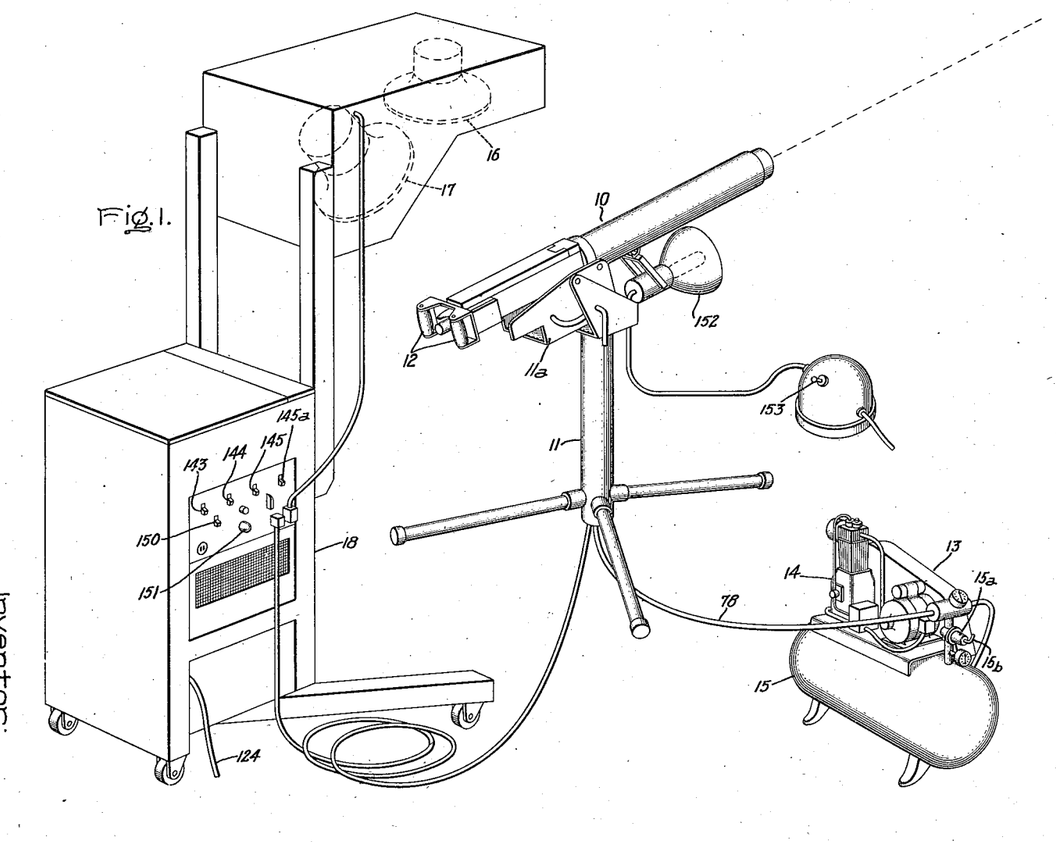
Fig. 1 is a perspective view illustrating various elements of this apparatus including an electrically controlled pneumatic gun, and noise producing apparatus and control elements.
Figure 2:
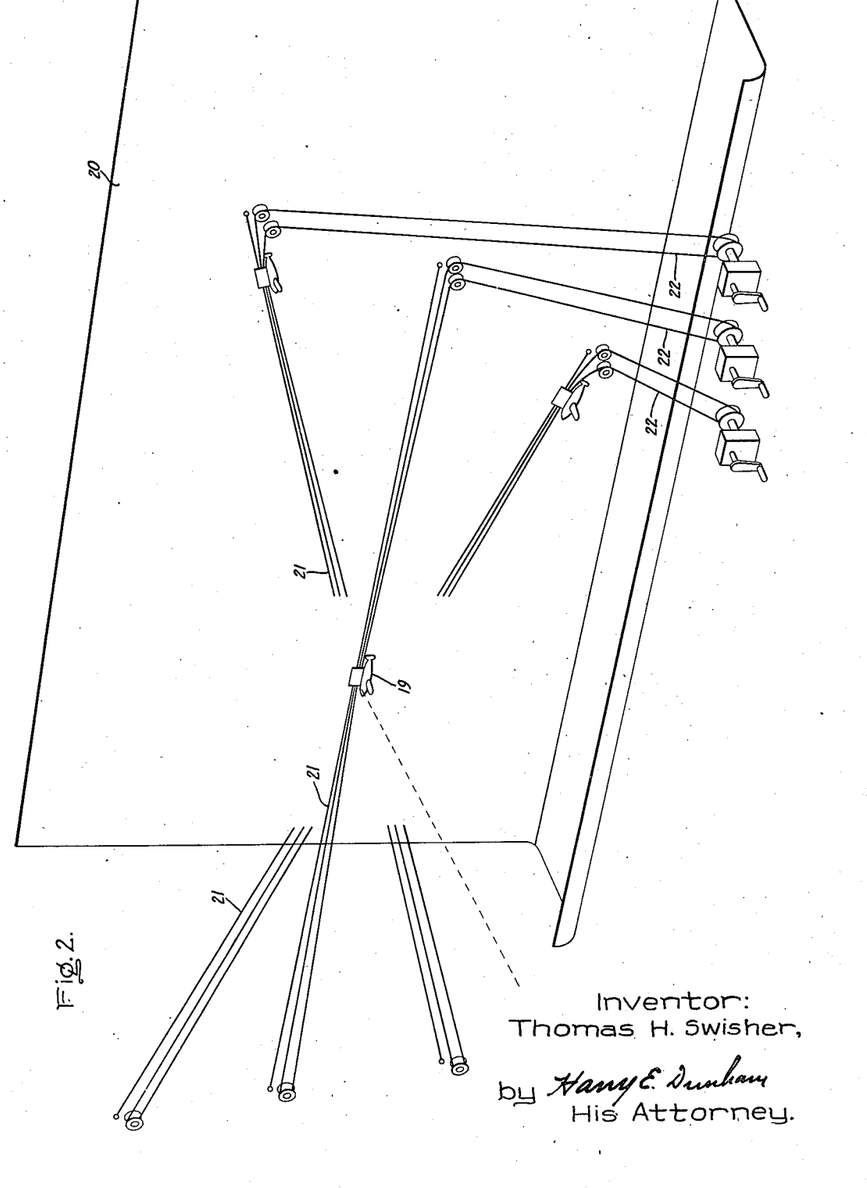
Fig. 2 is a perspective view illustrating a target system used with this apparatus.

Referring more particularly to Figs. 1 and 2, this apparatus comprises an electrically-controlled air-operated gun 10 which is mounted upon a tripod 11 and cradle 11a for movement in azimuth and elevation, the pointing of the gun being controlled by means of handles 12. The gun is supplied by air from an air compressor unit 13 having a motor driven compressor 14, a storage tank 15 and a pressure regulator 15a. Also, as shown in Fig. 1, the apparatus comprises a loud speaker 16 for supplying gun blast sound, a loud speaker 17 for supplying battle sound, and a control unit 18 for controlling the operation of the gun 10, and for creating sound effects supplied to the two loud speakers 16 and 17.

It is intended that the gun shall "fire" or project spherical pellets which will be formed of any suitable material, such as a molded plastic, and that they will be fired at a movable target 19, shown in Fig. 2. Placed back of the target 19 will be a screen 20. The screen 20 may have a contrasting color to the pellets so that they may be used as "tracers," or it may have the color the same as the pellets so that the pellets may be invisible when the gun is aimed by sights.

Figures 3, 4, 5:
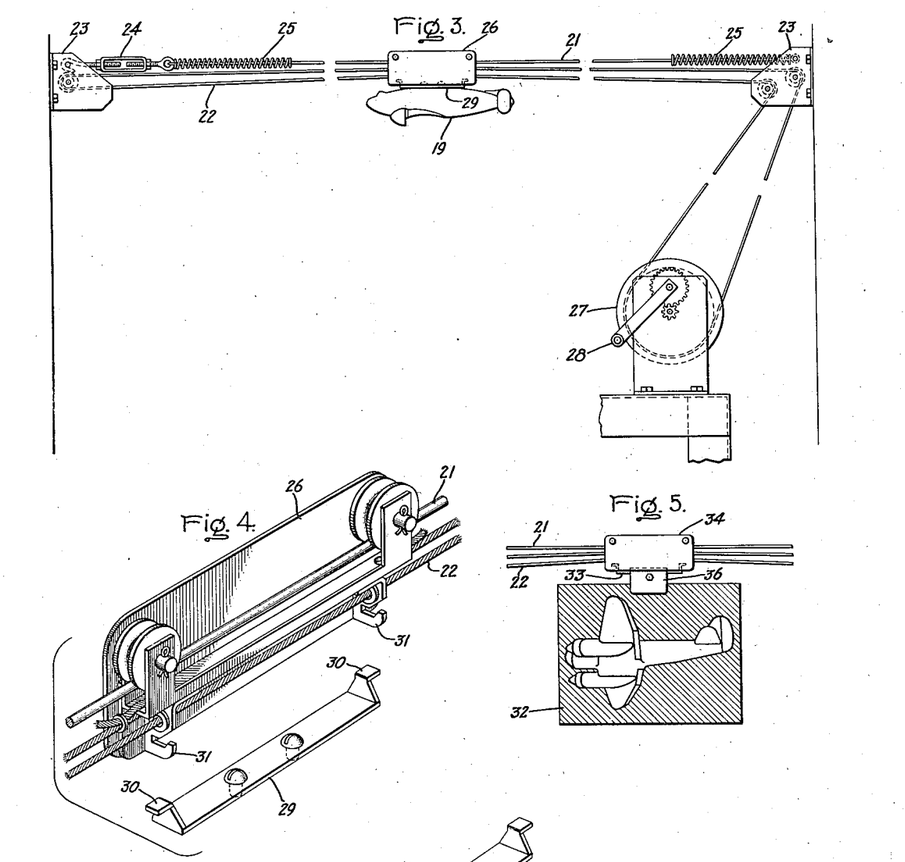
Fig. 3 is an elevation illustrating target moving means in detail.
Fig. 4 is a perspective view illustrating trolley mechanism for the target.
Fig. 5 is an elevation illustrating mounting means for a different type target.
Figure 6:
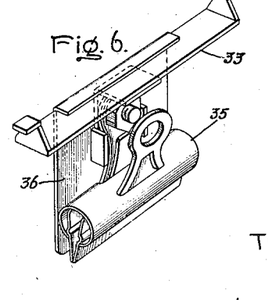
Fig. 6 is a perspective view illustrating mounting means for the target shown in Fig. 5.

The target 19 is mounted upon any one of a series of trolley wires 21, and it is driven by means of tow cords and pulley systems 22; the trolley and pulley systems are shown in detail in Fig. 3. Here it will be observed that the trolley wire 21 is suspended between pulley brackets 23, the right-hand end being anchored to the right-hand pulley bracket while the left-hand end is attached to the left-hand pulley bracket through a turnbuckle 24. Bumper springs 25 are mounted on the opposite ends of the trolley wire 21. As shown in Fig. 4, the opposite ends of the tow cord 22 are anchored to the target carriage 26, while the remainder of its length passes over the pulleys and a towing reel 27 having a suitable driving crank 28. In this way it will be understood that when the crank 28 is rotated, it will operate the tow cord to cause the carriage 26 to move back and forth on the trolley wire. The target 19 is provided with a supporting frame 29 having extending ends 30 which are intended to be mounted in hooks 31 on the carriage 26 so that the target 19 may be pointed in either direction.

A different form of target is shown in Fig. 5 wherein the target consists in a cardboard or metal background sheet 32 upon which the image of the target is drawn. This target has a supporting bracket 33 similar to the bracket 29, and it is secured to its carriage 34 in a similar way. Here, however, the target 32 is secured to its bracket 33 by means of a spring clip 35 having the shape of the conventional paper clip and which in turn is secured to the supporting bracket 36.

The pellets are given the spherical form to provide ease in handling, and their diameter has been chosen so that their visibility on the miniature range is similar to the visibility of real tracer bullets.

The plastic pellets, which have approximately only one-sixth the weight of steel balls of the same size, for example, are slowed down more by air resistance than steel balls. The time of flight of the plastic pellets is thus greater than for steel pellets having the same muzzle velocity. The lightweight feature of the plastic pellets is therefore an important factor in duplicating the time of flight of real bullets.

The time of flight of the pellets is adjustable by adjusting the shooting air pressure by means of pressure regulator 15a, Fig. 1, which has an adjustment knob 15b. The time of flight of the pellets from the gun to the target can therefore be made substantially the same as the time of flight of a real bullet from a gun to a target. The training range and targets are scaled down to reproduce in miniature what will be encountered in actual battle. A convenient reduction has been found to be one to thirty. Fifty feet on the training range would then equal five hundred yards in actual battle. A model airplane target with a one-foot wing span would represent a real airplane with a thirty-foot wing span.

The speed of the targets can be made proportional to the speed of a real airplane. By properly coordinating the range, size and speed of the airplane targets, with the time of flight of the pellets, the angle of sighting lead is substantially the same as will be encountered in real battle. This is true either with "tracer-control" aiming, or when aiming by calibrated ring-and-bead, or reflector sights, as used in aerial warfare.

Figure 7:
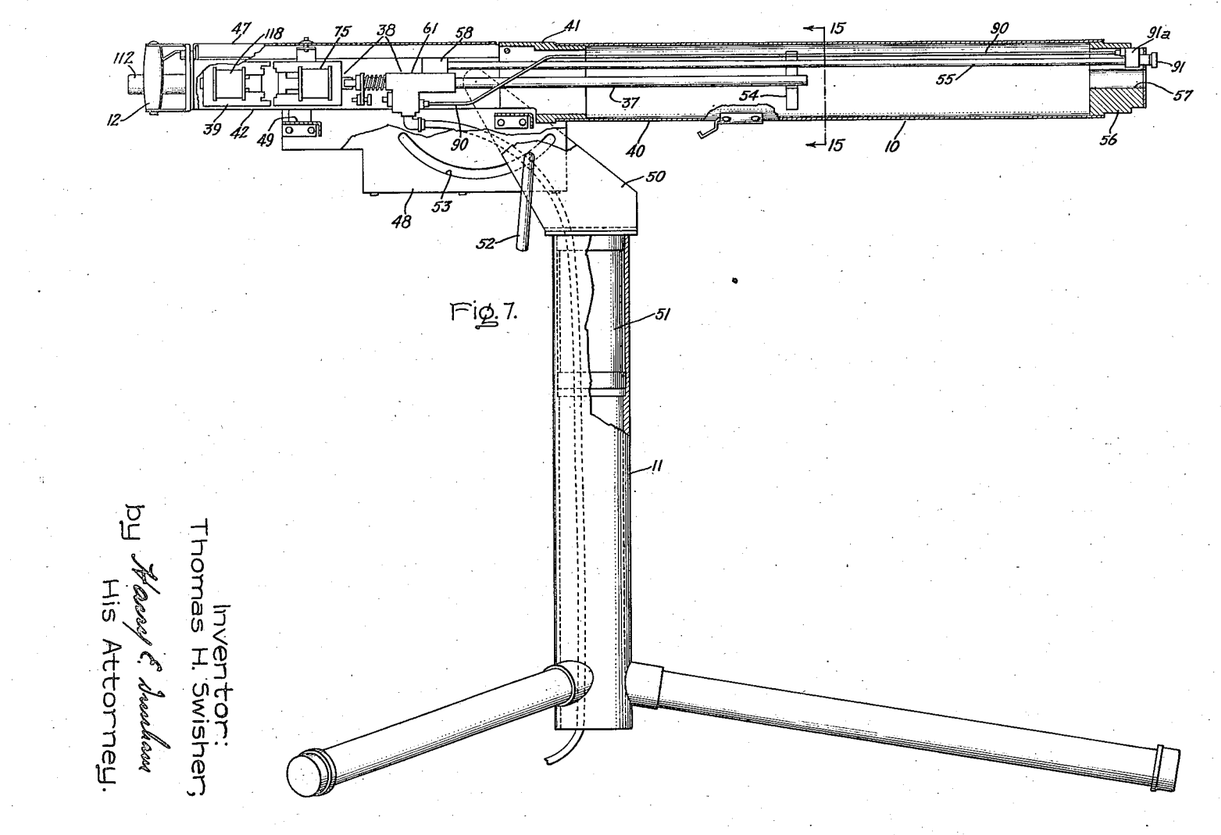
Fig. 7 is an elevation, partly in section, illustrating the electrically controlled pneumatic gun of Fig. 1.
Figure 8:
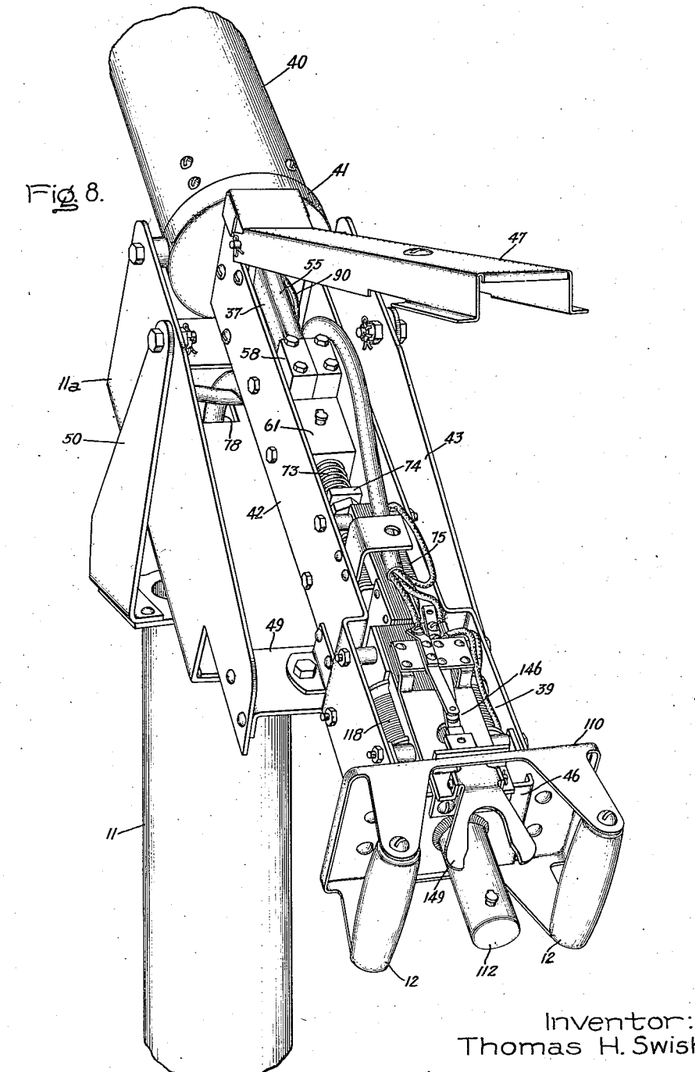
Fig. 8 is an enlarged perspective view of a portion of this pneumatic gun.
Figure 10:
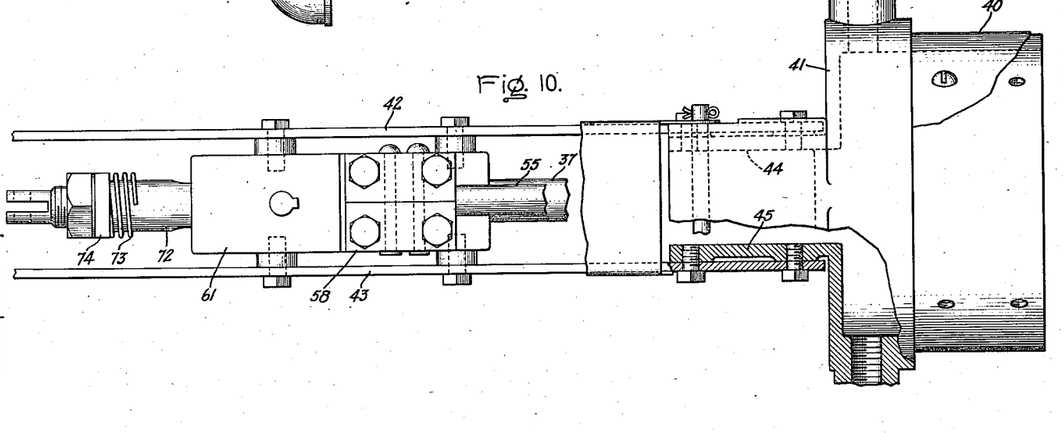
Fig. 10 is a plan view of the portion of the gun shown in Fig. 9.
Figure 22:
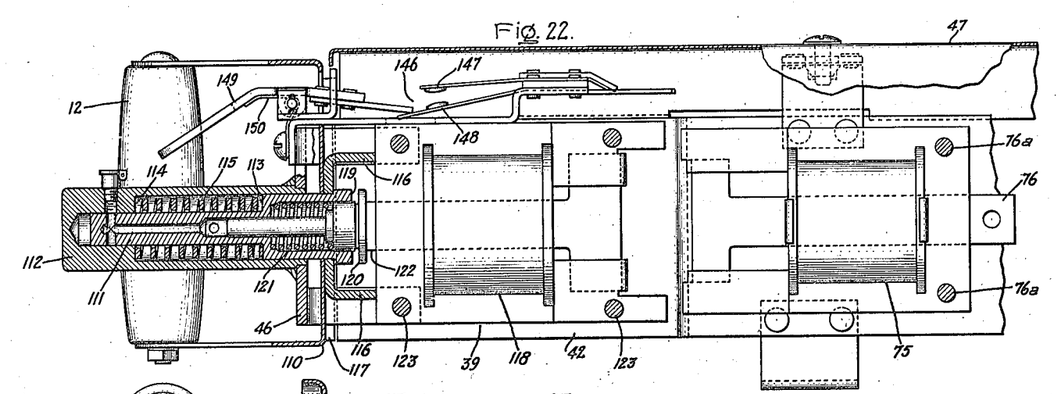
Fig. 22 is an elevation, mainly in section, illustrating details of construction of the trigger end of the pneumatic gun.
Figure 23:
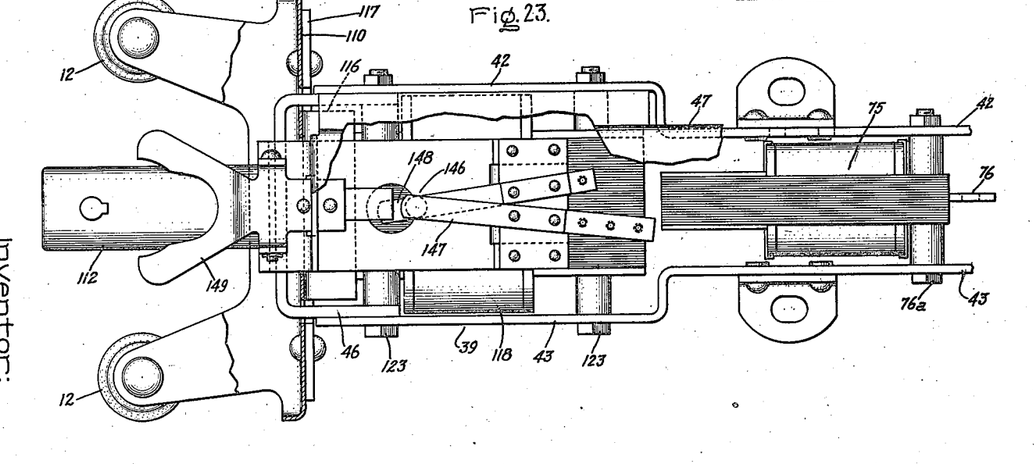
Fig. 23 is a top plan view of the elements shown in Fig. 22, parts being broken away so as to illustrate certain details of construction.
Figure 24:
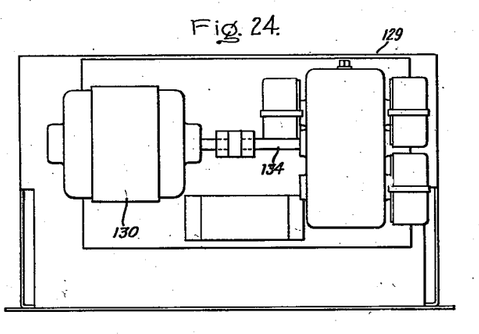
Fig. 24 is a diagrammatic plan view illustrating certain timing control mechanism used in controlling the pneumatic gun and sound producing mechanism.

Referring to Fig. 7, the pneumatic gun 10 comprises a barrel 37, a pellet charging and firing mechanism 38, and a recoil mechanism 39. Surrounding the barrel 37 is a large cylindrical casing 40 which at its rear is supported by a relatively massive cylinder 41, and the front end of which projects beyond the muzzle of the gun barrel, as shown. Extending rearwardly from the relatively massive cylinder 41 are a pair of side plates 42 and 43 which are shown more clearly in Figs. 8 and 10, and which at their forward ends are secured to a pair of parallel extensions 44 and 45 provided on the supporting cylinder 41. At their rear ends they are secured together by a U-shaped end plate 46 shown more clearly in Figs. 22 and 23. The two plates 42 and 43 are covered at the top by a hinged cover 47.

The large cylinder 40, the side plates 42 and 43, and the cover give the gun the size and shape of the actual gun that it is wished to accustom the trainee to. In the specific example shown this is a Browning machine gun, caliber .50, water-cooled.

The elements just referred to are mounted upon the channel-shaped supporting cradle 11a; as shown, the cylindrical casing 41 is rigidly secured to the forward upper edges of the side walls of this member, while the side plates 42 and 43 are secured to a cross plate 49 at the rear of this member. The two side walls of this member are pivotally mounted upon a yoke 50 so that the gun can be moved in elevation. The yoke 50 in turn is provided with a depending cylinder 51 (Fig. 7) which cylinder is received in the tripod pedestal 11 so that the gun can be moved in azimuth. The cradle 11a can be locked to the yoke 50 to hold the gun in its adjusted position in elevation by a lock having a handle 52 which has an extension projecting through an arcuate slot 53 in one of the side plates of the member 48, and which when turned forces a locking nut (not shown) against this side plate to hold it from moving. The details of construction of this locking mechanism have not been further illustrated because they form no part of the present invention.

Figures 15, 16, 17, 18, 19:
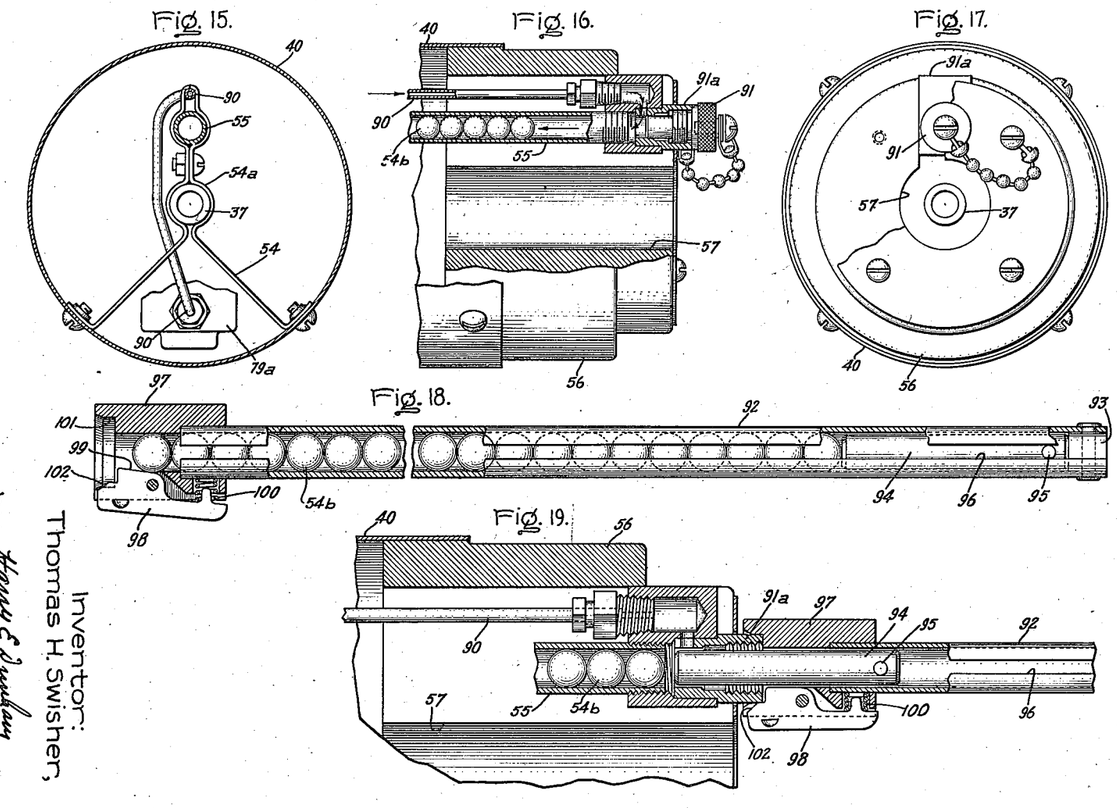
Fig. 15 is an enlarged sectional view taken through the line 15—15 of Fig. 7 and looking in the direction of the arrows.
Fig. 16 is an elevation of a portion at the muzzle end of the pneumatic gun, the view being shown mainly in section.
Fig. 17 is an elevation view looking at Fig. 16 from the right-hand side.
Fig. 18 is an elevation, partly in section, illustrating certain loading mechanism used with the gun.
Fig. 19 is a fragmentary sectional view illustrating the loading apparatus of Fig. 18 applied to the pneumatic gun.

The muzzle end of the gun barrel is stabilized by means of a Y-shaped bracket 54 which is shown more clearly in Fig. 15. This bracket as shown is provided with an enlargement 54a through which the gun barrel 37 projects. The extremities of the legs of the bracket are rigidly secured to the cylinder 40, as shown.

The pellets 54b which are fed to the gun are supplied from a magazine 55 which is in the form of an elongated tube extending from the very forward end of the cylinder 40 back to the loading and firing mechanism 38 above the barrel 37, as shown. At its forward end this magazine 55 is supported by means of a plug 56 inserted in the muzzle end of the casing 40. It will be observed that the plug is provided with a central bore 57 through which the pellets fired from the gun barrel may pass.

Figure 9:
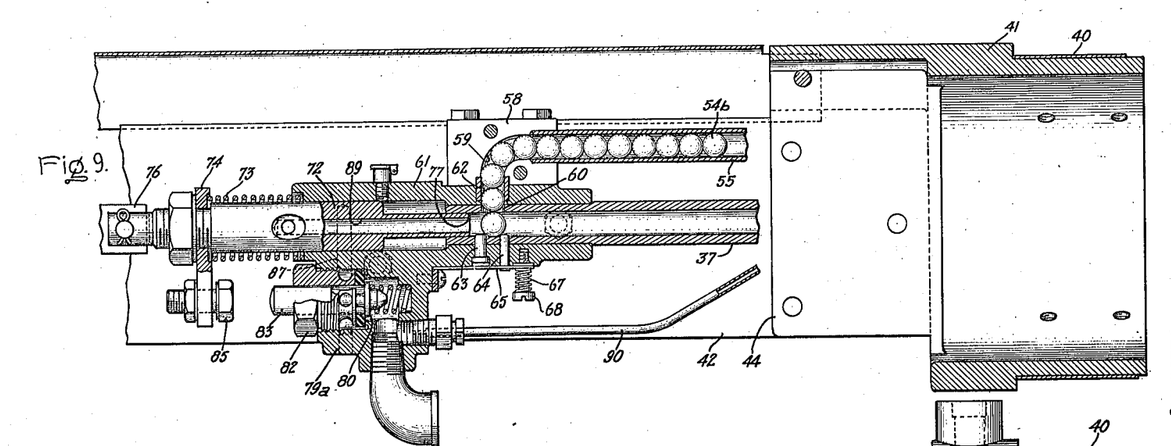
Fig. 9 is a fragmentary elevation in section through a portion of the pneumatic gun.

As shown in Fig. 9, the rear of the magazine tube 55 enters a block 58 which has an arcuate passageway 59 therein and which passageway feeds the pellets to a feed opening 60 in the upper wall of the gun barrel 37.

The block 58 is supported upon a piston block 61 which as shown surrounds the rear end of the gun barrel 37 and which has an opening 62 through which the pellets may pass to the gun barrel opening 60.

When a pellet has been supplied to the barrel, it is held in position ready for shooting by a holding means comprising a pair of pin-like plungers 63 and 64 which are spaced apart lengthwise of the barrel under the opening 60 so that when a pellet is fed into the barrel the projecting pins prevent it from rolling out of the barrel. These pins are biased upwardly to their holding positions by means of a plate 65 which is shown more clearly in Fig. 14. At its rear this plate is clamped to the bottom side of the piston block 61 by means of a block 66, and its forward end is biased upwardly by means of a compression spring 67 mounted upon a stud 68 which is directed through an opening 69 provided for it in the outer end of the plate 65. The plunger 63 bears directly on the upper surface of the plate 65, while the plunger 64 at its lower end has a reduced section 70 which is received in a key-slot 71 provided for it in the plate 65 for a purpose to be presently described.

As has been pointed out previously, the pellets are projected by means of air under pressure. But prior to the time the air is admitted to the back of the pellet it is mechanically released from the plungers 63 and 64. For this, and other purposes, a piston 72 slides within the piston block 61. It is biased to its retracted position toward the left, as viewed in Figs. 9 and 11, by means of a compression spring 73 having one end bearing on the rear wall of the piston block 61 and its other end bearing on a collar 74 secured to the rear end of the piston. The piston is forced forwardly to move the pellet from its holding means by means of an electromagnet 75 (Figs. 7, 8, 22, and 23), the armature of which magnet is connected to the piston by a link 76. This magnet is rigidly clamped between the two side plates 42 and 43 by means of bolts 76a.

Figures 11, 12, 13, 14:
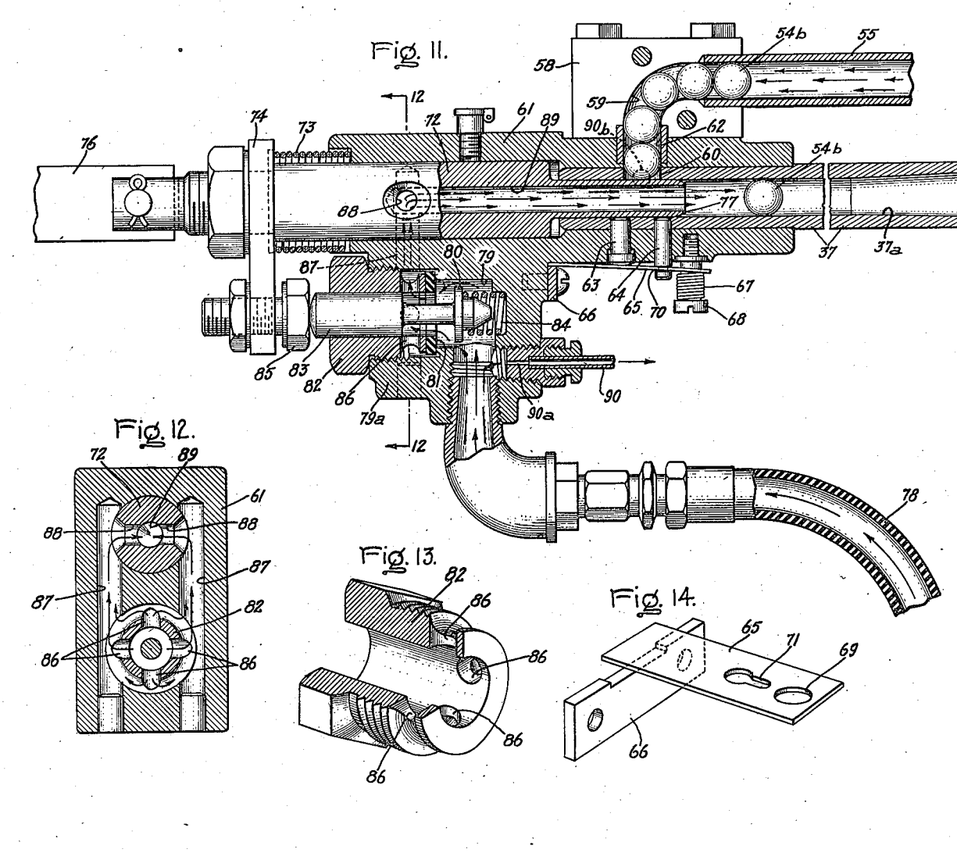
Fig. 11 is an enlarged fragmentary elevation view, mainly in section, of that portion of the pneumatic gun shown in Fig. 9, but with operative parts in another position.
Fig. 12 is a sectional view taken through the line 12—12 of Fig. 11 and looking in the direction of the arrows.
Fig. 13 is a perspective view of a portion of the apparatus shown in Fig. 11, parts being shown in section so as to illustrate certain details of construction.
Fig. 14 is a perspective view illustrating parts of the apparatus shown in Fig. 11.

In order that a pellet be started in its forward motion without any rotation being imparted to it, the forward end of the piston 72 is provided with a sharp circular edge 77 that functions to engage and grip the pellet to prevent rotation thereof as the piston drives it forwardly away from the holding plungers (see Fig. 11). This forward end is also tapered to depress the holding plungers 63 and 64 as it moves forwardly. Thus when the piston moves forwardly, its forward end first engages the left-hand pin 63 and depresses it. This pin when it is depressed moves the plate 65 downwardly, which operation also depresses the pin 64 which is connected to the plate through the key slot 71. Then the piston in its forward movement engages the pellet and pushes it forwardly, free from any impediment.

At this time, the air pressure is admitted back of the pellet to project it from the gun barrel. The air pressure supplied by the air compressing unit 13 is fed to the gun through a flexible tube 78 and into a valve chamber 79 formed in a valve housing 79a. The flow of air through this chamber is controlled by means of a valve 80 which coacts with a valve seat 81 that is mounted on the forward part of the plug 82 in which the valve stem 83 is mounted to move. The valve 80 is biased toward the seat by a spring 84; and is moved to its open position by the forward movement of the piston 72 through the collar 74, which as shown carries an abutment 85 in the form of a bolt threaded in the collar and positioned to engage the valve operating plunger 83 to open the valve when the piston moves to release the pellet. The air flowing through the seat 81 enters the plug 82 and flows outwardly therefrom in radial directions through a series of openings 86 into a pair of passageways 87 in the piston block 61, and thence flows through passageways 88 in the piston 72 into a central passageway 89 thereof, which passageway directs the air directly back of the spherical pellet.

It will be observed that when the plunger 72 moves forwardly to release the pellet, it shuts off the opening 60 so that this opening is blocked off, preventing the admission of an additional pellet.

Therefore, the piston 72 functions to release the pellet 54b, to hold it against rotation immediately after it has been released, to shut off the supply of pellets, and to control the admission of air to the barrel back of the pellet, all during its forward stroke. In this way the full impact of the air pressure is applied instantly to the pellet at the time it is released, and the pellet is forced forwardly in a straight line without rotating. On its return stroke the piston permits the fluid supply valve 80 to reclose, uncovers the feed hole 60, and releases the holding plungers 63 and 64, whereby another pellet is supplied to the barrel from the magazine.

As has been pointed out above, the pellet is forced through the barrel with a straight line motion and without rotation. To insure that the pellet continues to move in this fashion after it leaves the gun barrel, the muzzle end 37a is flared outwardly in a funnel-like shape, as clearly shown in Fig. 11. When a round pellet is shot out of a round opening by compressed air it is apt to be deflected sideways, rotated, or both, due to "blow-by" of air. The flared end relieves the air pressure gradually thereby substantially eliminating the "blow-by" effect.

A continuous air pressure is applied to the column of pellets 54b in the magazine tube 55, and for this purpose an air tube 90 is connected to the supply conduit 78 and to the forward end of the magazine, as shown more clearly in Fig. 16. This air pressure applies a continuous pressure to the column of pellets so that when the piston 72 is retracted another pellet will be instantly fed in the gun barrel. For purposes of economy, this air pressure is reduced by orifice 54 to a minimum value sufficient for the above operation. At the gun barrel terminal end of the magazine feed there is a feed air bleeder hole 90b.

The forward end of the magazine tube 55 is closed by a screw plug 91, which is threaded in an end fitting 91a for the tube, so that when the magazine is empty it may be refilled through its forward end. In order to conveniently refill the magazine tube 55, a loading tube 92 (Figs. 18, 19, and 20) is provided. This tube at its right-hand end, as viewed in Fig. 18, is closed by a plug 93, and operable from this end there is a loading bolt 94 which has an operating pin 95 extending from the tube through an elongated slot 96 extending from end to end of the tube, whereby when the bolt is forced toward the left the pellets will be driven from the tube. In order to prevent accidental loss of the pellets from the loading tube, it is provided at its left-hand end, as viewed in Fig. 18, with holding means comprising a collar 97 secured to this end of the tube and which supports a latch 98. The latch has a holding surface 99 which when the latch is in its position shown in Fig. 18 restricts the passageway through the collar 97 and prevents discharge of the pellets. The latch is biased to this position by means of a spring 100.

The collar 97 has a recess 101 in its outer end which is arranged to be fitted to the magazine fitting 91a, as shown in Fig. 19, once the screw plug 91 has been removed. The latch 98 is provided with an inclined surface 102 which is engaged by the outer end of the magazine tube fitting 91a when the loading tube is applied, as shown in Fig. 19, so as to be moved to a releasing position, whereby the bolt 94 can be operated to force the pellets into the magazine tube 55. When the magazine tube 55 has been loaded, the loading tube will of course be removed, and the plug 91 replaced.

Figure 20:
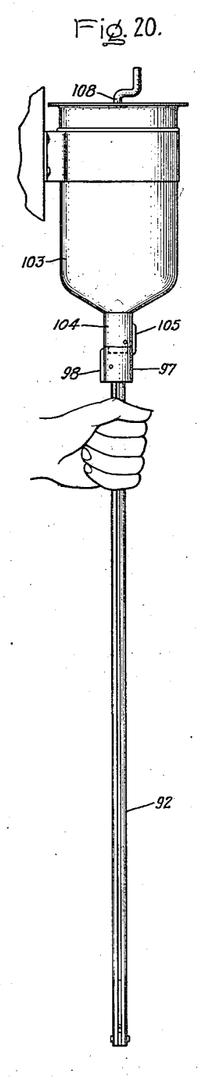
Figs. 20 and 21 are elevations, the latter figure being mainly in section, illustrating further elements of the loading mechanism.
Figure 21:
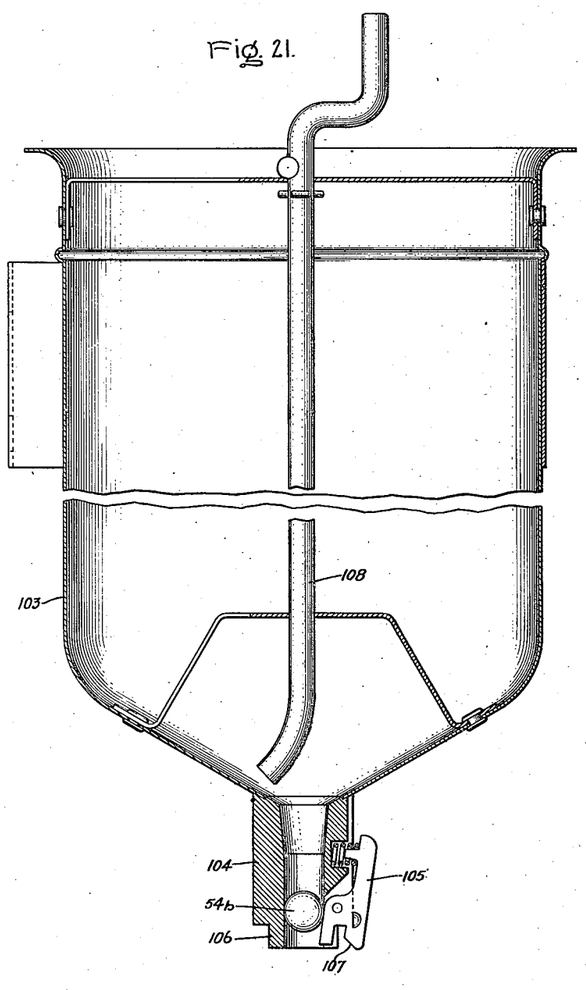

The loading tube 55 itself is loaded from a hopper 103 (Figs. 20 and 21) which discharges through a lower nozzle 104. This nozzle is formed in a manner similar to the construction of the collar 97 of the loading tube in that here also there is provided a latch 105, spring pressed to a latching position, to prevent loss of the pellets. This member, however, has a reduced extension 106 which is received in the recess 101 of the loading tube when the loading tube is applied, as shown in Fig. 20. When it is thus applied, the collar 97 engages an inclined surface 107 on a latch 105 to move it to its releasing position to permit the pellets to flow down into the loading tube. The hopper is provided with a stirring rod 108 to stir the pellets to facilitate their flow from the hopper.

Certain features of the gun thus far described are described and claimed in my copending application, Serial No. 552,152, filed August 31, 1944, which application is a division of the instant application.

As was pointed out previously, the gun further comprises a recoil mechanism 39 shown in Figs. 7, 8, 22, 23. This recoil mechanism is for the purpose of violently vibrating the gun handles 12 so that the trainee gets the effect of actual gun recoil. The gun handles 12 are mounted directly upon a bracket 110, and the handles and bracket are not rigidly attached to the rest of the gun, but are relatively movable with relation to the gun in the direction of the axis of the gun barrel. Secured to the bracket 110 is a plunger 111, which plunger operates within a cylinder 112. The cylinder 112 is rigidly secured to the gun frame end plate 46 previously referred to. Interposed between a shoulder 113 on the plunger 111 and a shoulder 114 on the cylinder 112 is a relatively strong compression spring 115, which spring forces the handles forwardly. The movement of the handles forwardly is limited by the arms 116 of a reenforcing plate 117 for the handle bracket 110, and which abut against the structure 118; this structure, as will be pointed out hereinafter, constitutes an electromagnet for operating the recoil mechanism. The recoil mechanism further comprises an anvil 119 formed on the plunger 111, and a cooperating hammer 120, the hammer normally being biased away from the anvil and against the armature 122 of the electromagnet 118 by means of a relatively light compression spring 121. When the electromagnet 118 is energized, its armature 122 and the hammer 120 move freely against the spring 121 for some distance, thereby building up momentum. The hammer 120 is thus made to violently strike the anvil 119 with a force much greater than the direct thrust of the armature alone at this point. From this point on, the armature 122, the hammer 120, the spring 121 and the handle bracket assembly 110 and 117 all move rearward together, against the force of the spring 115. The energy of momentum of the armature and hammer, plus the direct thrust of the electromagnet are thereby transmitted directly to the handles 12, causing them to be pushed rearward in a quick motion. When the magnet is deenergized, the spring 115 returns the handles to their forward position. In this way, when the magnet is alternately energized and deenergized the handles 12 are violently vibrated so as to simulate the recoil effect of an actual machine gun.

The electromagnet 118 is mounted between the side plates 42 and 43 and is secured by bolts 123, as shown.

As pointed out previously, the loud speakers 16 and 17 are provided for supplying gun blast sound and battle sound respectively. The battle sound is generated by suitable records which are operated by a suitable turntable and associated driving mechanism, and amplifier, which will be mounted within the control section 18. The tone arm 123a is shown diagrammatically in Fig. 28. The speaker 17 also is indicated diagrammatically in Fig. 28, and its power comes from an alternating current source of supply 124. As indicated in Fig. 28, a suitable amplifier 125 will be supplied for speaker 17.

Figure 28:
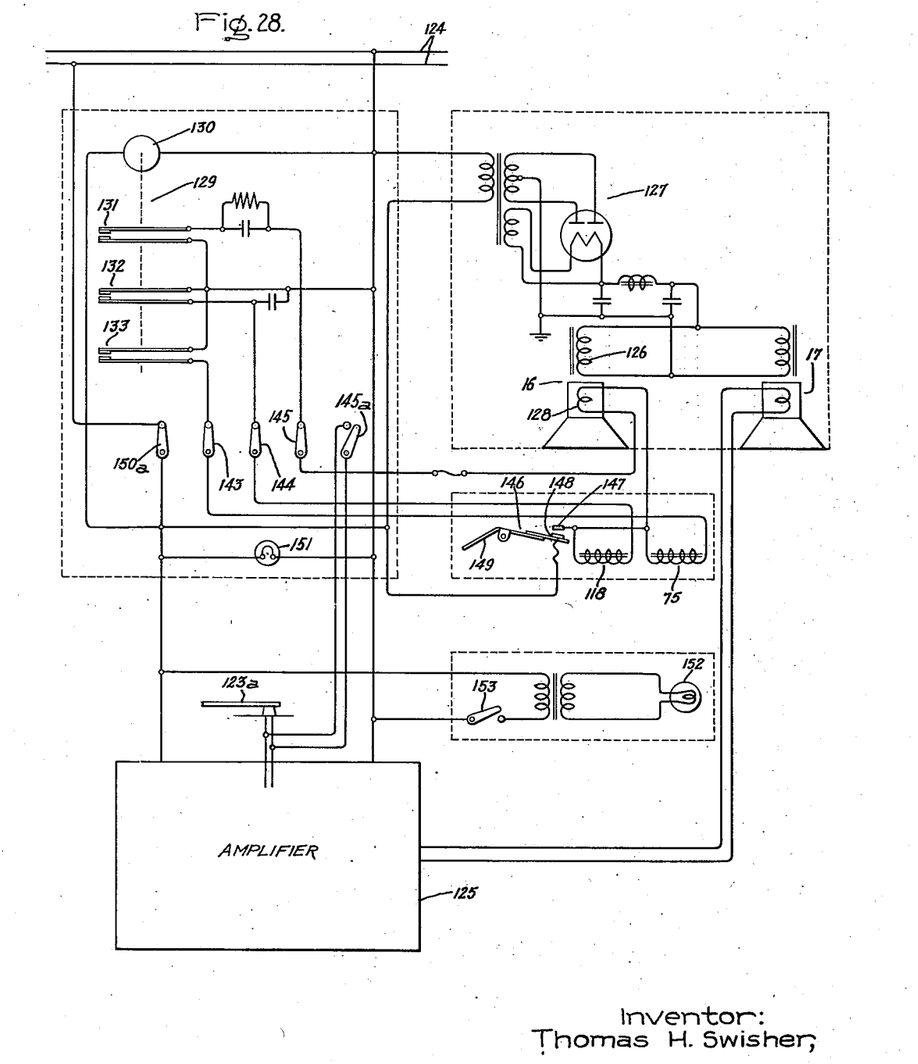
Fig. 28 is a diagrammatic representation of elements of the gun timing circuit and sound producing equipment, and control means therefor.

The gun blast sound speaker 16 also is illustrated diagrammatically in Fig. 28, its field coil 126 also being supplied from the source 124 through a network 127. The "voice" coil 128 of this speaker is controlled in timed relation with the operation of the two electromagnets 75 and 118, and these in turn are controlled in timed relation to each other by means of a timing mechanism 129. This mechanism comprises a constant speed motor 130 driving three controlling contact mechanisms 131, 132, and 133, which control respectively the energization of the gun sound coil 128, the recoil electromagnet 118, and the firing electromagnet 75.

Figures 25, 27:
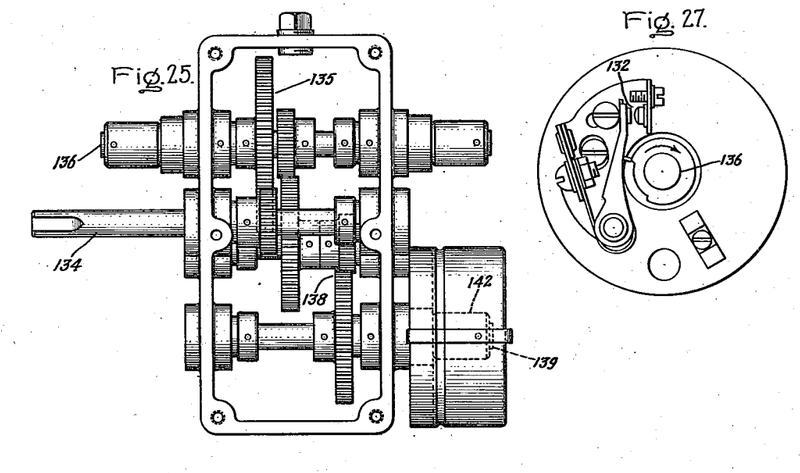
Fig. 25 is an enlarged plan view of a portion of the mechanism shown in Fig. 24, a part being removed so as to illustrate certain details of construction.
Figs. 26 and 27 are elevation views of certain switching mechanism used in the timing apparatus of Figs. 24 and 25.
Figure 26:
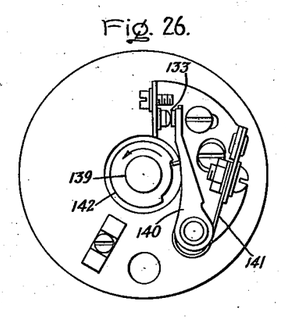

The timing mechanism is shown in detail in Figs. 24 to 27 inclusive wherein the timing motor 130 drives a shaft 134 which through gearing 135 drives a shaft 136 and through gearing 138 drives a shaft 139; the shaft 136 is a high speed shaft while the shaft 139 is a relatively low speed shaft. The shaft 136 operates the recoil and gun sound contact mechanisms 132 and 131 respectively, while the shaft 139 operates the firing contact mechanism 133. The firing and gun sound contact mechanisms are identical, except for "on" period of the cams, and one—that for firing—is shown in Fig. 26. Here the two contacts of the switch 133 are shown, one being fixed and the other being mounted on a movable arm 140 which is biased by spring 141 to close the contacts. They are operated to the open position periodically by a cam 142 driven by the shaft 139 in a counterclockwise direction, as viewed in Fig. 26. The recoil contact mechanism is the same, except that it is constructed for a cam operating in a clockwise direction, and this mechanism is shown in Fig. 27.

The timing mechanism controls the firing, recoil, and muzzle blast sound mechanisms through three manually operable switches 143, 144, and 145 respectively so that these mechanisms can be operated altogether or one at a time. In addition, a separate switch 145a is provided for manually controlling the operation of the battle sound mechanism. And the firing, recoil and muzzle blast sound mechanisms all are under the control of a master switch 146 which is a trigger switch and which is shown in detail in Figs. 8, 22 and 23. As there shown, it comprises a fixed contact 147 and a movable contact 148; the movable contact 148 is biased upwardly to close the contact 147, but is held in its open position by means of a trigger 149. The trigger 149 is pivotally mounted to the end plate 46 and, by means of a spring 150, is biased in the clockwise direction, as viewed in Fig. 22. This trigger, in size, shape, and position, is identically the same as the actual trigger of the aforesaid Browning machine gun.

The control system (Fig. 28) further comprises a main switch 150a which is used to control the energization and deenergization of the entire system, and in addition there is a pilot light 151 which is lighted whenever the switch 150a is closed.

In the operation of this control system, if the main switch 150a be closed as well as the switches 143, 144, and 145, the timing motor 130 will be energized to continuously operate the switches 131, 132, and 133. However, these switches cannot effect any controlling actions on the firing, recoil, and gun sound mechanisms until the trigger 149 is depressed to close the switch 146. When the trigger is depressed, circuits will be completed to the firing magnet 75, the recoil magnet 118, and the voice coil 128, and they will thereafter be deenergized and reenergized on a timed basis as determined by the timing mechanism. It is contemplated that the recoil and gun sound mechanisms will be operated at the same number of times per minute that a Browning machine gun fires, for example, six hundred times. It is further contemplated that the firing mechanism will be operated only the number of times that the actual tracer bullets would be fired; for example, it may be operated one-hundred twenty times, which would be equivalent to one tracer in every five shots. By changing the gearing 138 the equivalent of one tracer for every two, three or four shots may be fired.

The battle sound mechanism is not under the control of the trigger 149, but is under the control of the switch 145a only so that the battle sound noises can be continuously generated, if desired.

For night firing it is contemplated to use a pellet and target which will fluoresce in an ultraviolet light field, and for this purpose an ultraviolet lamp 152 is mounted upon the machine gun 10, as shown in Fig. 1. This lamp is of the reflector type and it projects its light to the point of impact of the pellets against the target. The lamp is indicated diagrammatically in Fig. 28, and it also is fed from the source 124. This lamp is controlled by a switch 153.

In operation: It will be understood that the target will be suspended on a trolley located at the proper scale distance from the gun, and that the target will be moved at the proper scale speed with reference to the speed of the real target.

The gun may then be operated with or without recoil, with or without battle sound, and with or without gun muzzle blast sound; or it may be operated with recoil and both battle and muzzle blast sound. The switches 143, 144, and 145 will be preset and the battle sound mechanism operated or not, as desired, after the main switch 150 has been closed.

The actual firing will be controlled by the trigger, as described.

For teaching tracer-control firing, white pellets are used against a dark background. The visibility is independent of the rate of fire; that is, the pellets are equally visible whether being fired "single-shot," or any rate up to the maximum.

If it is desired to teach the trainees to shoot by aiming with sights, as distinguished from tracer control, white pellets may be used against a white background. For complete invisibility, clear pellets may be used; a pellet formed of clear molded plastic material is suitable.

For training for night firing, the ultraviolet lamp is energized and a pellet formed of plastic material impregnated with a red fluorescent material is used. Also a fluorescent target, which may be formed of a metal painted with fluorescent paint, will be used. The pellets glow red, giving a tracer effect.

Certain broad features of apparatus and method here disclosed for training personnel in the art of firing real automatic machine guns and comprising a gun for projecting pellets at a target, the pellets simulating live ammunition fired by the real gun, together with sound producing mechanism for generating sound simulating actual gun muzzle blasts and for producing actual battle sound background noises; for projecting the pellets through a relatively short range as compared with the combat range of the live bullets projected from said known gun and with such force that the time of flight of the pellets approximates that of the live bullets, together with a target scaled down in size in a predetermined ratio to that of an actual known target, the ratio corresponding to the ratio of the pellet range to that of the combat range of the live bullets; and the pellets formed of a material visible to the trainee throughout their trajectory, are not my invention, but form the subject matter of the copending application of Stanley E. Rice, Serial No. 504,491, filed September 30, 1943, and which was assigned to the assignee of the instant application.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a training gun which simulates an actual automatic machine gun, a gun frame, a handle, means for mounting said handle on said frame providing for limited relative movement between them in the direction of the gun bore, a spring between said handle and frame resisting said relative movement, a cooperating hammer and anvil on said handle and frame, and means for periodically moving said hammer and anvil together to move said handle relative to said frame against the force of said spring.

2. In a training gun which simulates an actual automatic machine gun, a gun barrel, a gun frame for said barrel, a handle, means attaching said handle to said frame providing for limited relative movement between them in the direction of the axis of the gun barrel, a spring forcing said handle forward in the direction of said gun barrel, an anvil fixed to said handle, a hammer mounted on said frame for movement into engagement with said anvil, a spring on said anvil forcing said hammer away therefrom, an electromagnet for forcing said hammer into engagement with said anvil, and means for periodically energizing said electromagnet in order to cause said hammer to periodically engage said anvil in order to vibrate said handle to simulate the recoil of the actual gun.

3. Fluid pressure gun-training apparatus comprising a gun for projecting pellets by means of fluid pressure, a pellet-feeding device for delivering a pellet to said gun and fluid pressure thereto to project said pellet from the gun, a recoil mechanism including a handle and means for moving said handle with reference to said gun for giving the effects of gun recoil to the hand of the operator, sound-producing means for simulating the muzzle blast sound of an actual gun, and time element control means for synchronously controlling the operation of said firing device, said recoil mechanism and said means for producing sound.

4. A training gun comprising an electroresponsive projecting mechanism for projecting a pellet simulating live ammunition, an electroresponsive recoil mechanism for imparting to the handle of the operator the recoil effects of an actual gun, an electroresponsive sound-producing mechanism simulating muzzle blast sound of an actual gun, and time element mechanism for controlling the operation of said various electroresponsive mechanisms so that they operate in a predetermined cycle.

5. A training gun comprising an electroresponsive projecting mechanism for projecting a pellet simulating live ammunition, an electroresponsive recoil mechanism for imparting to the hands of the operator the recoil effects of an actual gun, an electroresponsive sound-producing mechanism simulating muzzle blast sound of an actual gun, time element mechanism for synchronously controlling the operation of said various electroresponsive mechanisms so that they operate in a predetermined cycle, and a trigger connected to said mechanisms to function as a master control therefor.

6. A training gun comprising an electroresponsive projecting mechanism for projecting a pellet simulating live ammunition, an electroresponsive recoil mechanism for imparting to the hands of the operator the recoil effects of an actual gun, an electroresponsive sound-producing mechanism simulating muzzle blast sound of an actual gun, time element mechanism for controlling the operation of said various electroresponsive mechanisms so that they operate in a predetermined cycle, a trigger connected to said mechanisms to function as a master control therefor, and switching means for rendering said various mechanisms operable or inoperable at will.

7. Gun-training apparatus for training a trainee to fire an actual automatic machine gun under conditions simulating actual fire and battle conditions comprising a gun for projecting pellets one after the other in a stream, a target, an ultraviolet reflector lamp attached to the gun and focused on the point of impact between the pellets and target, and said pellets and target being provided with exterior surfaces which fluoresce in the light projected by said lamp.

THOMAS H. SWISHER.